(12) United States Patent
Wachi

(10) Patent No.: US 7,935,285 B2
(45) Date of Patent: May 3, 2011

(54) METHOD OF MANUFACTURING A GOLF BALL

(75) Inventor: Toshiro Wachi, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 459 days.

(21) Appl. No.: 11/730,821

(22) Filed: Apr. 4, 2007

(65) Prior Publication Data

US 2008/0246183 A1    Oct. 9, 2008

(51) Int. Cl.
*B28B 11/06*    (2006.01)
*B29C 47/00*    (2006.01)
*A63B 37/00*    (2006.01)

(52) U.S. Cl. ........ 264/131; 264/130; 264/134; 264/148; 264/210.3; 264/210.6; 264/211; 264/236; 264/250; 264/255; 264/279.1; 264/320

(58) Field of Classification Search ........................ None
See application file for complete search history.

(56) References Cited

U.S. PATENT DOCUMENTS

| | | | | |
|---|---|---|---|---|
| 2,255,772 | A | * | 9/1941 | Hanna ............................ 264/130 |
| 4,526,640 | A | * | 7/1985 | Deregibus ...................... 156/242 |
| 4,561,657 | A | * | 12/1985 | Tominaga et al. ............. 473/372 |
| 4,650,193 | A | * | 3/1987 | Molitor et al. ................. 473/373 |
| 6,258,302 | B1 | * | 7/2001 | Nesbitt ......................... 264/40.1 |
| 6,705,463 | B1 | * | 3/2004 | Bucholtz et al. ........... 206/315.9 |
| 7,226,975 | B2 | * | 6/2007 | Voorheis et al. .............. 525/193 |
| 2002/0016228 | A1 | * | 2/2002 | Emerson et al. .............. 473/378 |
| 2002/0137848 | A1 | * | 9/2002 | Sone et al. .................... 525/192 |
| 2006/0166761 | A1 | * | 7/2006 | Kim et al. ..................... 473/371 |

FOREIGN PATENT DOCUMENTS

| JP | 56136347 | * 10/1981 |
|---|---|---|
| JP | 2001334001 | * 4/2001 |
| JP | 2001-334001 A | 12/2001 |

* cited by examiner

*Primary Examiner* — Jeffrey Wollschlager
(74) *Attorney, Agent, or Firm* — Sughrue Mion, PLLC

(57) ABSTRACT

The invention provides a method of manufacturing a golf ball composed at least in part of a spherical elastomeric body. The method includes the steps of extruding a bar of an unvulcanized rubber compound for obtaining the elastomeric body, cutting the extruded bar into slugs of a given length, and coating the slug with a saturated or unsaturated carboxylic acid metal salt in powder form having a melting point at or below a vulcanizing temperature. This method prevents the slugs from clumping together and improves mold releasability.

10 Claims, No Drawings

METHOD OF MANUFACTURING A GOLF BALL

BACKGROUND OF THE INVENTION

The present invention relates to a method of manufacturing solid golf balls, particularly solid golf balls having a solid core, such as two-piece golf balls and multi-piece golf balls having three or more pieces Elastomeric bodies for golf balls are obtained by extruding fixed amounts of an unvulcanized rubber composition as slugs, and vulcanizing the slugs in a vulcanizing mold. The surfaces of the slugs which have been cut to a fixed size are sticky, giving the slugs a tendency to clump together. Accordingly, it is desired that the slugs be coated on the surface with a parting agent so as to make the surface less sticky. Yet, because the unvulcanized rubber composition from which elastomeric bodies for golf balls are to be obtained undergoes a decline in resilience and becomes difficult to work when exposed to moisture, it is undesirable to use a parting agent prepared by dissolution or dispersion in an aqueous solvent. There is thus a desire to use a powder such as talc as the parting agent. However, incorporating talc or the like within the rubber composition after vulcanization greatly lowers the durability of the finished golf ball to impact. Therefore, when talc or the like is used, the extruded slugs are collected and stored in small numbers per box.

JP-A 2001-334001 discloses "a golf ball manufacturing method which includes the step of applying rubber powder after vulcanization and curing." Although this prior art does have the effect of preventing unvulcanized rubber from clumping together, it is ineffective on vulcanized rubber.

SUMMARY OF THE INVENTION

It is therefore an object of the invention to provide a golf ball manufacturing method which effectively prevents slugs from sticking and clumping together, improves workability during extrusion and vulcanization, is effective also in demolding the rubber following vulcanization, and can enhance the core performance.

After conducting extensive investigations, the inventor has discovered that when slugs prepared by mixing the ingredients of a rubber composition for producing spherical elastomeric bodies to be used in the formation of solid cores or the like then cutting the mixture into pieces of a given size are coated with a saturated or unsaturated carboxylic acid metal salt in powder form which has a melting point no higher than the vulcanization temperature, the slugs can be prevented from clumping together and the releasability from the mold can be improved.

Accordingly, the invention provides the following method for manufacturing golf balls.
(1) A method of manufacturing a golf ball composed at least in part of a spherical elastomeric body, comprising the steps of extruding a bar of an unvulcanized rubber compound for obtaining the elastomeric body, cutting the extruded bar into slugs of a given length, and coating the slugs with a saturated or unsaturated carboxylic acid metal salt in powder form having a melting point at or below a vulcanizing temperature.
(2) The method of manufacturing a golf ball of (1) above, wherein the saturated or unsaturated carboxylic acid metal salt powder has a particle size of at most 1 mm.
(3) The method of manufacturing a golf ball of (1) above, wherein the saturated or unsaturated carboxylic acid metal salt powder is applied to a coating weight in a range of between 0.2 and 2.0 parts by weight per 100 parts by weight of the slug.
(4) The method of manufacturing a golf ball of (1) above, wherein the saturated or unsaturated carboxylic acid in the saturated or unsaturated fatty acid metal salt is selected from the group consisting of stearic acid, 12-hydroxystearic acid, montanic acid, behenic acid, lauric acid, p-t-butylbenzoic acid, undecylenic acid, ricinolic acid, myristic acid, palmitic acid, acrylic acid, methacrylic acid and fumaric acid.
(5) The method of manufacturing a golf ball of (4) above, wherein the metal which forms a saturated or unsaturated carboxylic acid metal salt is selected from the group consisting of magnesium, zinc, aluminum, calcium, barium, lithium, sodium, potassium and iron.
(6) The method of manufacturing a golf ball of (1) above, wherein the golf ball has a spherical core which is made of the spherical elastomeric body and includes a rubber component that is a polybutadiene having a cis-1,4 bond content of at least 60 wt % and synthesized using a rare-earth catalyst.
(7) The method of manufacturing a golf ball of (1) above, wherein the golf ball has a spherical core which is made of the spherical elastomeric body and includes a rubber component that is a modified polybutadiene rubber obtained by synthesis using a neodymium catalyst followed by reaction with a terminal modifier.
(8) The method of manufacturing a golf ball of (1) above, wherein the golf ball has a spherical core which is made of the spherical elastomeric body and includes a rubber component that is a polybutadiene having a cis-1,4 bond content of at least 60 wt % and a 1,2-vinyl bond content of at most 2 wt %.

In the method of the invention, before heat is applied, the saturated or unsaturated carboxylic acid metal salt powder acts as an agent that prevents sticking of the unvulcanized rubber. After heat is applied, the molten saturated or unsaturated carboxylic acid metal salt acts as a mold release agent by oozing out between the mold and the core. Moreover, the powder also makes its way onto the uneven surface of the slug of unvulcanized rubber and, with vulcanization, is able to increase the surface hardness.

Therefore, by mixing together the ingredients of the rubber composition, cutting the composition into slugs of a given size, and coating the slugs with a saturated or unsaturated carboxylic acid metal salt powder having a melting point no higher than the vulcanizing temperature for the elastomeric body, the slugs can be prevented from clumping together and the mold releasability can be improved, enabling the efficient production of golf balls having a soft interior and a hard exterior.

DETAILED DESCRIPTION OF THE INVENTION

As noted above, the inventive method of manufacturing a golf ball composed at least in part of a spherical elastomeric body includes the steps of extruding a bar of unvulcanized rubber compound for obtaining the elastic body, cutting the extruded bar into slugs of a predetermined length, and coating the slugs with a saturated or unsaturated carboxylic acid metal salt in powder form having a melting point at or below a vulcanizing temperature.

The slugs used in the invention are formed by kneading a rubber composition for a golf ball core or the like, then cutting up the kneaded composition into pieces of a given diameter and size.

The primary material in the slug may be suitably selected from among rubber-based materials commonly used in golf balls, although polybutadiene having a cis-1,4-bond content of at least 60 wt % and synthesized using a rare-earth catalyst is especially preferred. The rare-earth catalyst is preferably a neodymium catalyst, and the polybutadiene used in the slug is preferably a modified polybutadiene obtained by subsequently reacting the synthesized polybutadiene with a terminal modifier. It is also preferable for the polybutadiene to be a polybutadiene having a 1,2-vinyl bond content of 2 wt % or less. Golf ball cores produced from polybutadiene which has been synthesized using a rare-earth catalyst and has a cis-1,4 bond content of at least 60 wt % can be endowed with an excellent rebound and have an excellent manufacturability.

Moreover, in addition to the above primary material (base rubber), the rubber composition also includes an unsaturated carboxylic acid or a salt thereof.

Examples of the unsaturated carboxylic acid include acrylic acid, methacrylic acid, maleic acid and fumaric acid. Acrylic acid and methacrylic acid are especially preferred. Examples of the metal salt of the unsaturated carboxylic acid include zinc salts and magnesium salts. Of these, zinc acrylate is preferred.

The unsaturated carboxylic acid or a salt thereof is included in an amount of preferably between 5 and 30 parts by weight, and especially between 10 and 20 parts by weight, per 100 parts by weight of the base rubber.

It is preferable to additionally include in the above-described rubber composition for forming hot-molded articles the following materials in the indicated amounts per 100 parts by weight of the base rubber: between 10 and 60 parts by weight, and especially between 20 and 40 parts by weight, of an inorganic filler such as zinc oxide, calcium carbonate or barium sulfate; and between 0.1 and 1.0 part by weight, and especially between 0.4 and 0.6 part by weight, of an organic peroxide such as dicumyl peroxide, 1,1-bis(t-butylperoxy)-3,5,5-trimethylcyclohexane and α,α'-bis(t-butylperoxy)diisopropylbenzene. Suitable amounts of elemental sulfur, an organosulfur compound such as pentachlorothiophenol and/or a metal salt thereof, an antioxidant and the like may also be included in the rubber composition.

The rubber composition may be obtained by uniformly mixing the above ingredients. The slugs that are used to practice the invention are not subject to any particular limitation, although they may be slugs obtained by extruding the rubber composition with an extruder, and cutting the extrudate to a fixed length. The slugs have diameter×length dimensions that are preferably in a range of between 15 (dia) mm×100 mm and 40 (dia) mm×30 mm, more preferably in a range of between 20 (dia) mm×70 mm and 38 (dia) mm×35 mm, and most preferably in a range of between 25 (dia) mm×60 mm and 35 (dia) mm×50 mm.

In the method of the invention, the slug is coated with a saturated or unsaturated carboxylic acid metal salt, following which it is vulcanized, thereby forming an elastomeric body such as a golf ball core. The saturated or unsaturated carboxylic acid metal salt may be suitably selected according to the vulcanization conditions required to form the core, although a material close to that making up the core is preferred so that it vulcanizes together with the core. The saturated or unsaturated carboxylic acid metal salt has a melting point of preferably 230° C. or below, more preferably between 80 and 180° C., and even more preferably between 100 and 150° C. The saturated or unsaturated carboxylic acid in the saturated or unsaturated carboxylic acid metal salt is preferably one or more selected from the group consisting of stearic acid, 12-hydroxystearic acid, montanic acid, behenic acid, lauric acid, p-t-butylbenzoic acid, undecylenic acid, ricinolic acid, myristic acid, palmitic acid, acrylic acid, methacrylic acid and fumaric acid. The metal in the saturated or unsaturated carboxylic acid metal salt is selected from among, for example, magnesium, zinc, aluminum, calcium, barium, lithium, sodium, potassium and iron.

The saturated or unsaturated carboxylic acid metal salt used in the invention has a particle size which is not subject to any particular limitation, provided it is of a degree that will allow the metal salt to adhere to the slug and reliably produce the desired effects. However, it is advantageous for the particle size to be preferably 1 mm or below, more preferably 0.8 mm or below, and most preferably 0.4 mm or below. The lower limit may be selected as appropriate, although a lower limit of at least 0.05 mm is preferred, and a lower limit of at least 0.10 mm is especially preferred.

The method for coating the slugs with the saturated or unsaturated carboxylic acid metal salt, while not subject to any particular limitation, preferably involves uniformly applying the metal salt to the surface of the slug. This may be achieved by cutting the slugs off into a container lined with the saturated or unsaturated carboxylic acid metal salt or by dusting the powder onto the slugs from above.

The above-described saturated or unsaturated carboxylic acid metal salt powder is applied in an amount of preferably between 0.1 and 2 g, and more preferably between 0.1 and 1 g, per slug. The amount applied is typically 1 g per slug. After the slug has been coated with the saturated or unsaturated carboxylic acid metal salt, it is advantageous for the slug to be vulcanized within a period of preferably 24 hours, more preferably 8 hours, and even more preferably 4 hours. If vulcanization is not carried out within this period of time, the powder itself may absorb moisture, which may make vulcanization in a preferred state impossible. It is desirable for the slugs which have been coated with the saturated or unsaturated carboxylic acid metal salt to be stored at as low a temperature and humidity as possible. Storage at 15° C. or below and a humidity of not more than 50% is preferred.

Because the slugs thus prepared have little tendency to stick together in clumps, they can be fed into a mold for vulcanization and molding under pressure more easily than is generally the case. Moreover, owing to the effects of the saturated or unsaturated carboxylic acid metal salt that has liquefied, the cores are more easily removed from the mold following vulcanization.

The slugs that have been coated with the saturated or unsaturated carboxylic acid metal salt in this way form cores or the like having a soft interior and a hard exterior owing to melting of the saturated or unsaturated carboxylic acid metal salt present on the slug surface and its effects as a co-crosslinking agent on vulcanization of the golf ball. As a result, there are obtained cores suitable for use in the manufacture of golf balls having an excellent feel on impact and low energy loss.

The golf ball of the invention may be a one-piece solid golf ball, a two-piece solid golf ball or a multi-piece solid golf ball composed of three or more pieces. In a one-piece solid golf ball of the invention, the elastomeric body makes up the ball. In a two-piece solid golf ball, the elastomeric body makes up the solid core. In a multi-piece solid golf ball, the elastomeric body makes up the solid core and/or the intermediate layer. In the latter case, it is especially preferable for the elastomeric body to make up the solid core.

The core produced here has a diameter of preferably between 20 and 42 mm, more preferably between 25 and 40 mm, and even more preferably between 30 and 38 mm. The core obtained has a deflection, as measured by the subsequently described method, of preferably between 1.5 and 6.0 mm, more preferably between 1.8 and 5.0 mm, and even more preferably between 2.0 and 4.5 mm.

The core has a Shore D hardness at the center of preferably between 5 and 70, more preferably between 10 and 60, and even more preferably between 15 and 45. The core has a Shore D hardness at the surface of preferably between 20 and 80, more preferably between 30 and 70, and even more preferably between 40 and 63. The difference between the hardness at the center of the core and the hardness at the surface of the core is preferably between 1 and 40, more preferably between 1 and 20, and even more preferably between 1 and 10. The core surface hardness is the hardness within 1 mm of the outer periphery of the core.

A conventional mold may be utilized as the mold for molding the core under applied pressure, and may be suitably selected according to the intended golf ball.

Aside from using the above-described slug, the golf ball of the invention may be manufactured by a known method using known materials suitable for the particular type of golf ball.

For example, in the practice of the invention, the golf ball may be one composed of two or more layers in which the core material is enclosed by an intermediate layer. The material used in the intermediate layer is not subject to any particular limitation. Illustrative examples include ionomer resins, polyester elastomers, polyamide elastomers, styrene elastomers, polyurethane elastomers, olefin elastomers and mixtures thereof. Use may also be made of a rubber-based material such as polybutadiene.

The intermediate layer has a thickness of preferably between 0.1 and 4.0 mm, more preferably between 0.2 and 3.0 mm, and even more preferably between 0.5 and 1.5 mm. The hardness of the intermediate layer material, expressed in terms of the Shore D hardness, is preferably between 40 and 85, more preferably between 45 and 80, and even more preferably between 55 and 75. The cover thickness is preferably between 0.1 and 4.0 mm, more preferably between 0.2 and 3.0 mm, and even more preferably between 0.6 and 1.5 mm. The hardness of the cover material, expressed in terms of the Shore D hardness, is preferably between 15 and 85, more preferably between 20 and 80, and even more preferably between 30 and 70.

The resin in the cover material is exemplified by ionomer resins, polyester elastomers, polyamide elastomers, styrene elastomers, polyurethane elastomers, olefin elastomers and mixtures thereof. The thickness is preferably between 0.5 and 2.5 mm, more preferably between 0.7 and 2.1 mm, and even more preferably between 0.8 and 2.0 mm.

EXAMPLES

Examples of the invention and Comparative Examples are given below by way of illustration, and not by way of limitation.

Examples and Comparative Example

In the respective examples, rubber compositions composed of the ingredients shown below were extruded as a bar using a rubber measuring extruder, and the bar was cut to a diameter of 35.0 mm and a length of 38 mm, thereby forming slugs.

Rubber Composition

| | |
|---|---|
| cis-1,4-Polybutadiene | 100 parts by weight |
| Zinc acrylate | 25 parts by weight |
| Dicumyl peroxide | 0.6 part by weight |
| Antioxidant | 0.1 part by weight |
| Zinc oxide | 30 parts by weight |

Details concerning these ingredients are provided below.
Polybutadiene (produced by JSR Corporation)
Zinc acrylate (Nihon Jyoryu Kogyou Co., Ltd.)
Dicumyl peroxide (NOF Corporation)
Antioxidant (Ouchi Shinko Chemical Industry Co., Ltd.)
Zinc oxide (Sakai Chemical Industry Co., Ltd.)

Zinc acrylate powder (fraction passing 75-µm screen, 99.9%; melting point, 120° C.) was coated onto the slugs as a parting agent in the amounts shown in Table 1.

Next, using a slug coated in this way with the parting agent, vulcanization was carried out for 10 minutes at 165° C. in a mold, thereby giving a solid core. The hardness of the resulting core was measured and the mold releasability after vulcanization was evaluated. The results are shown in Table 1.

TABLE 1

| | | Comparative Example | Example 1 | Example 2 |
|---|---|---|---|---|
| | Parting agent weight (g) | 0.0 | 0.1 | 0.3 |
| Slug | Weight (g) | 37.2 | 37.2 | 37.2 |
| Core | Diameter (mm) | 38.0 | 38.0 | 38.0 |
| | Weight (g) | 36.4 | 36.4 | 36.4 |
| | Core deflection[1] (mm) | 3.5 | 3.5 | 3.5 |
| | Shore D hardness, inside[2] | 36 | 36 | 36 |
| | Shore D hardness, outside[3] | 36 | 38 | 43 |
| | Mold releasability after vulcanization | Fair | Good | Exc |

[1] Deflection: Deflection (mm) of core or ball when placed on a hard plate and compressed under a final load of 1,275 N (130 kqf) from an initial load of 98 N (10 kgf).
[2] Shore D hardness, inside: Measured near core center.
[3] Shore D hardness, outside: Measured within 1 mm inside outer periphery of core.
Mold releasability after vulcanization
Exc: Excellent releasability
Good: Good releasability
Fair: Releasable A three-piece golf ball was produced by forming an intermediate layer made of Himilan 1605 over the surface of the above solid core, then forming a cover layer made of Himilan 1557 over the intermediate layer. The durability was evaluated by the method described below. The results are shown in Table 2. "Himilan" refers to ionomer resins manufactured by DuPont-Mitsui Polychemicals Co., Ltd.

TABLE 2

| | | Comparative Example | Example 1 | Example 2 |
|---|---|---|---|---|
| Intermediate layer | Thickness (mm) | 1.3 | 1.3 | 1.3 |
| | Hardness (Shore D) | 60 | 60 | 60 |
| Cover | Thickness (mm) | 1.0 | 1.0 | 1.0 |
| | Hardness (Shore D) | 55 | 55 | 55 |
| Finished ball | Diameter (mm) | 42.7 | 42.7 | 42.7 |
| | Weight (g) | 45.4 | 45.4 | 45.4 |
| | Ball deflection[1] (mm) | 3.5 | 3.5 | 3.5 |
| Durability | Cracking begins | 403 times | 412 times | 408 times |
| | Cracking average | 490 times | 490 times | 489 times |

Durability Test Method

The durability of the balls obtained in each example when subjected to an impact equivalent to a shot taken with a driver at a head speed of 45 m/s were compared. Using N=10 balls as the basis for evaluation in each example, the number of shots that had been taken with the first ball to crack when cracking occurred in that ball was indicated as the "Cracking begins" value for that example. The number of shots that had been taken with each individual ball when it cracked was averaged for all ten balls and indicated as the "Cracking average" value for that example.

It is apparent from the above results that coating slugs with a saturated or unsaturated carboxylic acid metal salt powder enhances the mold releasability after vulcanization.

The invention claimed is:

1. A method of manufacturing a golf ball composed at least in part of a spherical elastomeric body, comprising the steps of extruding a bar of an unvulcanized rubber compound for obtaining the elastomeric body, cutting the extruded bar into slugs of a given length, coating the slugs with a powder substantially comprising a saturated or unsaturated carboxylic acid metal salt having a melting point at or below a vulcanizing temperature, wherein the saturated or unsaturated carboxylic acid metal salt powder is applied to a coating weight in a range of between 0.1 and 2.0 g per slug, and hot-molding the unvulcanized rubber compound, thereby to form the spherical elastomeric body for a core having a Shore D hardness difference between the center and the surface of the core of from 1 to 10, wherein a zinc acrylate is used as the saturated or unsaturated carboxylic acid metal salt, and wherein the particle size of the saturated or unsaturated carboxylic acid metal salt is 75 μm or below.

2. The method of manufacturing a golf ball of claim 1, wherein the golf ball has a spherical core which is made of the spherical elastomeric body and includes a rubber component that is a polybutadiene having a cis-1,4 bond content of at least 60 wt % and synthesized using a rare-earth catalyst.

3. The method of manufacturing a golf ball of claim 1, wherein the golf ball has a spherical core which is made of the spherical elastomeric body and includes a rubber component that is a modified polybutadiene rubber obtained by synthesis using a neodymium catalyst followed by reaction with a terminal modifier.

4. The method of manufacturing a golf ball of claim 1, wherein the golf ball has a spherical core which is made of the spherical elastomeric body and includes a rubber component that is a polybutadiene having a cis-1,4 bond content of at least 60 wt % and a 1,2-vinyl bond content of at most 2 wt %.

5. The method of manufacturing a golf ball of claim 1, wherein the slugs which have been coated with the saturated or unsaturated carboxylic acid metal salt are stored at a temperature less than or equal to 15° C. and in a humidity of not more than 50% before hot-molding.

6. The method of manufacturing a golf ball of claim 1, wherein the slugs are vulcanized within a period of 24 hours after being coated with the saturated or unsaturated carboxylic acid metal salt.

7. The method of manufacturing a golf ball of claim 1, wherein the saturated or unsaturated carboxylic acid metal salt has a melting point of 230° C. or below.

8. The method of manufacturing a golf ball of claim 1, wherein the slugs include between 10 and 60 parts by weight of an inorganic filler, and between 0.1. and 1.0 part by weight of an organic peroxide, in the amounts per 100 parts by weight of the base rubber, respectively.

9. The method of manufacturing a golf ball of claim 1, wherein the slugs include pentachlorothiophenol or a metal salt thereof.

10. The method of manufacturing a golf ball of claim 1, where the center of the core has a Shore D hardness of from 5 to 70 and the surface of the core has a Shore D hardness of from 20 to 80.

\* \* \* \* \*